United States Patent [19]

Ross

[11] Patent Number: 5,156,819

[45] Date of Patent: * Oct. 20, 1992

[54] STEAM SCRUBBING SYSTEM FOR EXHAUST GASES

[76] Inventor: Jody D. Ross, 121 E. 39th St., Suite A, Boise, Id. 83714

[*] Notice: The portion of the term of this patent subsequent to Apr. 4, 2006 has been disclaimed.

[21] Appl. No.: 503,792

[22] Filed: Apr. 3, 1990

Related U.S. Application Data

[60] Continuation-in-part of Ser. No. 332,882, Apr. 3, 1989, abandoned, which is a division of Ser. No. 183,899, Apr. 20, 1988, Pat. No. 4,818,256.

[51] Int. Cl.$^5$ .............................................. B01D 53/34
[52] U.S. Cl. .................................... 422/168; 55/83; 55/263; 55/107; 423/210; 423/235; 423/242; 423/243.01
[58] Field of Search ............... 55/83, 263, 107; 422/168; 423/210, 235, 242

[56] References Cited

U.S. PATENT DOCUMENTS

| | | | |
|---|---|---|---|
| 1,563,125 | 10/1924 | Ward | 55/263 |
| 1,741,995 | 6/1925 | Schobrone | 261/116 |
| 2,186,125 | 1/1940 | Roberts | 55/263 |
| 2,525,347 | 10/1950 | Gilman | 55/107 |
| 2,702,949 | 3/1952 | Parker, Jr. | 34/57 |
| 2,812,929 | 11/1957 | Rushford | 261/17 |
| 3,239,999 | 4/1963 | Price | 55/223 |
| 3,456,622 | 7/1967 | Thornton et al. | 122/379 |
| 3,713,277 | 1/1973 | Sackett, Sr. | 55/223 |
| 3,744,221 | 7/1973 | Ross | 55/263 |
| 3,778,981 | 12/1973 | Ross | 55/263 |
| 3,779,709 | 12/1973 | Yamada | 23/260 |
| 3,904,376 | 9/1975 | Kawata | 23/284 |
| 3,910,766 | 10/1975 | Yamada | 23/260 |
| 3,912,469 | 10/1975 | Ewan et al. | 55/263 |
| 3,920,423 | 11/1975 | Ross | 55/459 |
| 4,059,419 | 11/1977 | Ross | 55/261 |
| 4,198,380 | 4/1980 | Kohl | 423/242 |
| 4,308,241 | 12/1981 | deVries | 423/210 |
| 4,345,916 | 8/1982 | Richards | 55/5 |
| 4,437,866 | 3/1984 | Pweblo | 55/85 |
| 4,446,109 | 5/1984 | Bakke | 422/168 |
| 4,583,999 | 4/1986 | Lindahl | 55/68 |
| 4,643,742 | 2/1987 | Hammarskog | 55/20 |
| 4,818,256 | 4/1989 | Ross | 55/422 |

FOREIGN PATENT DOCUMENTS 596448 10/1925 France.

*Primary Examiner*—Bernard Nozick
*Attorney, Agent, or Firm*—Mallinckrodt & Mallinckrodt

[57] ABSTRACT

A steam scrubber system passes an exhaust gas to be cleaned into a steam scrubber chamber having substantially saturated steam therein. The substantially saturated steam particles have strong negative charges which attract positively charged particles to be extracted from the exhaust gas causing such particle to agglomerate and fall from the exhaust gas-steam mixture. Where it is desired to add a treatment chemical to the steam, a liquid containing the treatment chemical is atomized in the chamber. In a preferred embodiment, some of the inflow of steam is directed toward an impingement plate against which a jet of a liquid carrying a treatment chemical is directed for atomization and mixing with the steam. The treatment chemical is one, such as lime, slaked or unslaked, which would be ineffective if mixed directly with the steam. The resulting mixture may be passed into a cooling and demisting chamber before release to the atmosphere. The system may employ double steam chambers juxtaposed about a cooling and dimisting chamber in common, from where the cleaned gas is passed into the atmosphere or otherwise.

21 Claims, 2 Drawing Sheets

STEAM SCRUBBING SYSTEM FOR EXHAUST GASES

RELATED APPLICATIONS

This is a continuation-in-part of my copending application Ser. No. 07/332,882 filed Apr. 3, 1989 now abandoned, which is a division of application Ser. No. 07/183,899 filed Apr. 20, 1988, now U.S. Pat. No. 4,818,256 issued Apr. 4, 1989.

BACKGROUND OF THE INVENTION

1. Field

The invention has to do with the removal of gaseous and particulate pollutants from various exhaust gases by the use of steam and chemically-charged steam.

2. State of the Art

The scrubbing of exhaust gases with steam to remove gaseous and particulate pollutants is disclosed in each of U.S. Pat. Nos. 3,744,221 of Jul. 10, 1973; 3,778,981 of Dec. 18, 1973; and 3,920,423 of Nov. 18, 1975 to Samuel Scott Ross, as well as in U.S. Pat. No. 3,904,376 of Sep. 9, 1975 to Tadao Kawata. None of these chemically charge the steam, but the use of chemicals such as lime (calcium carbonate) in conjunction with the water scrubbing of exhaust gases is disclosed by U.S. Pat. Nos. 3,456,622 of Jul. 22, 1969 and 3,779,709 of Dec. 18, 1973, and a de-misting stage for exhaust gases scrubbed by a water spray is disclosed by U.S. Pat. No. 3,713,277 of Jan. 30, 1973.

SUMMARY OF THE INVENTION

In accordance with the present invention, an industrial exhaust gas to be treated is passed through a steam scrubber wherein it is contacted by a wet steam. The wet steam particles, having a negative charge, attract the positively charged particulate matter in the exhaust gas which collect on the steam particles and agglomerate and fall out of the gas flowing through the chamber. A wet or saturated steam has been found to be most effective for use in the steam scrubber.

Further, in accordance with the present invention, a liquid solution or suspension of a treatment chemical for an industrial exhaust gas, which chemical cannot be mixed effectively directly with steam, for example water carrying lime as calcium carbonate or calcium hydroxide, is introduced under pressure into steam as a carrier and is atomized for mixing with the exhaust gas. This is advantageously accomplished by directing an incoming jet of the chemical liquid against an impingement plate in the scrubber chamber toward which a flow of incoming steam is also directed, the jet of chemical liquid preferably crossing the flow of steam prior to impingement of either against the impingement plate, which plate is preferably placed so as to direct the resulting highly atomized liquid angularly into the exhaust gas within a steam scrubber chamber. The steam vapor becomes charged with the chemical and effects particle conglomeration within the chamber. Such steam vapor naturally carries a negative electrical charge, some of which is picked up by the atomized chemical liquid and helps sub-micron sized particles of the atomized chemical liquid to conglomerate with the pollutant particles to be removed from the exhaust gas to be cleaned, which are normally positively charged. The particle conglomerates drop the bottom of the chamber and are washed away by outflowing liquid.

The system of the invention may include cooling of the steam-scrubbed and chemically-treated exhaust gas before release to the atmosphere by passing such exhaust gas through a chamber into which cold water is sprayed. This coincidentally removes any residual steam mist from such exhaust gas.

The system may comprise a single steam scrubber chamber coupled to a cooling chamber and a stack for discharge of the clean gas into the atmosphere, or it may comprise multiple steam chambers arranged to treat fractional parts, respectively, of the stream of inflowing exhaust gas to be cleaned, as for example by clustering such steam scrubber chambers about a central cooling chamber in common leading into a stack in common. The cooling chamber may be provided at its bottom with a pool of water is recirculated through cooling means and through sprays within such chambers by pumping from the pool.

THE DRAWINGS

Embodiments of steam scrubber apparatus constituting the best mode presently contemplated for carrying out the invention in actual practice are illustrated in the accompanying drawings in which:

FIG. 1 is a view in elevation of a single steam chamber scrubber system, portions of walls of the steam chamber and the cooling chamber being broken out to reveal internal structure;

FIG. 2, an elevation partly in vertical section of a lower portion of the internal structure of the steam scrubber chamber looking from the line 2—2 in FIG. 1 and drawn to a considerably larger scale;

FIG. 3, a horizontal sectional view taken on the line 3—3 of FIG. 1 and drawn to a considerably larger scale, with flow being indicated by broken lines and appended arrows;

FIG. 4, a top plan view, largely schematic and partly in horizontal section taken along lower and upper planes to show lower and upper ports, respectively, of a multiple scrubber system wherein the flow of incoming exhaust gas is divided in half and sent, respectively, to sections which each comprises double steam scrubbing chambers;

FIG. 5, a vertical section taken on the line 5—5 of FIG. 4 to show the system of FIG. 4 in side elevation, upper portions and fragmentary parts of lower portions of the steam scrubbers in the foreground being broken away to show the steam scrubbers in the background and the cooling and demisting chamber in axial vertical section; and FIG. 6, a vertical section through a coupling of the steam supply conduit and the perforated pipe injecting steam into the scrubber showing how moisture content of the steam can be increased.

DETAILED DESCRIPTION OF ILLUSTRATED EMBODIMENTS

Figure 1:
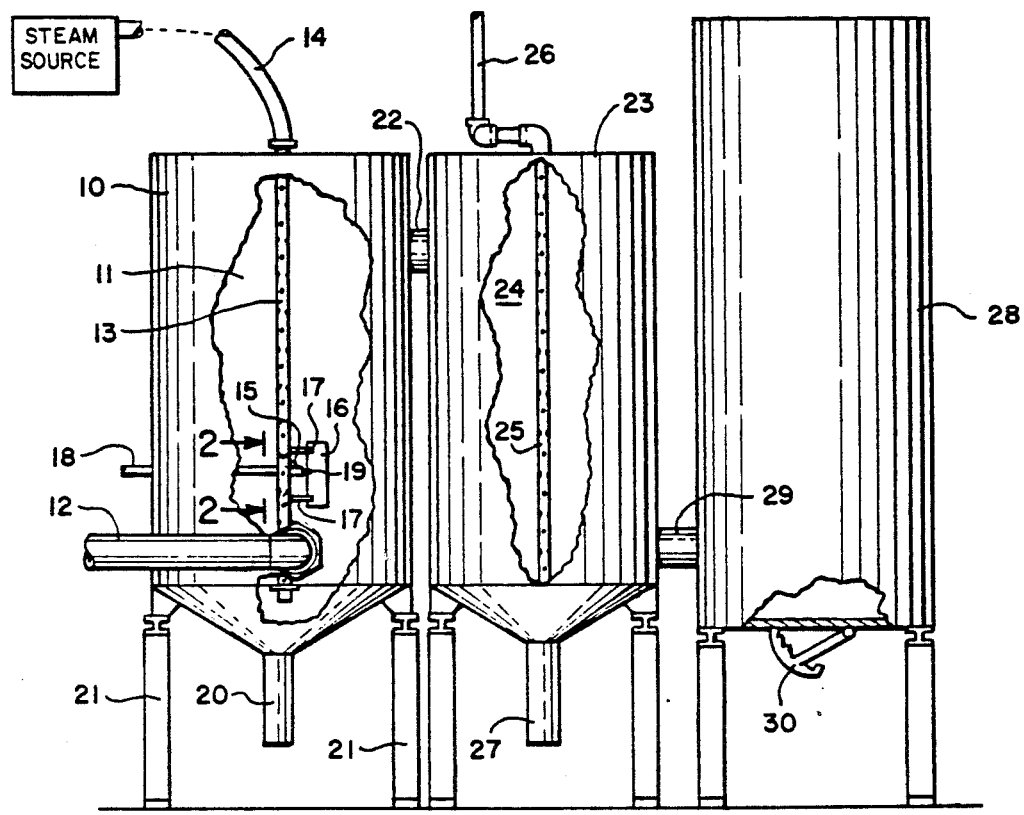
Figure 2:
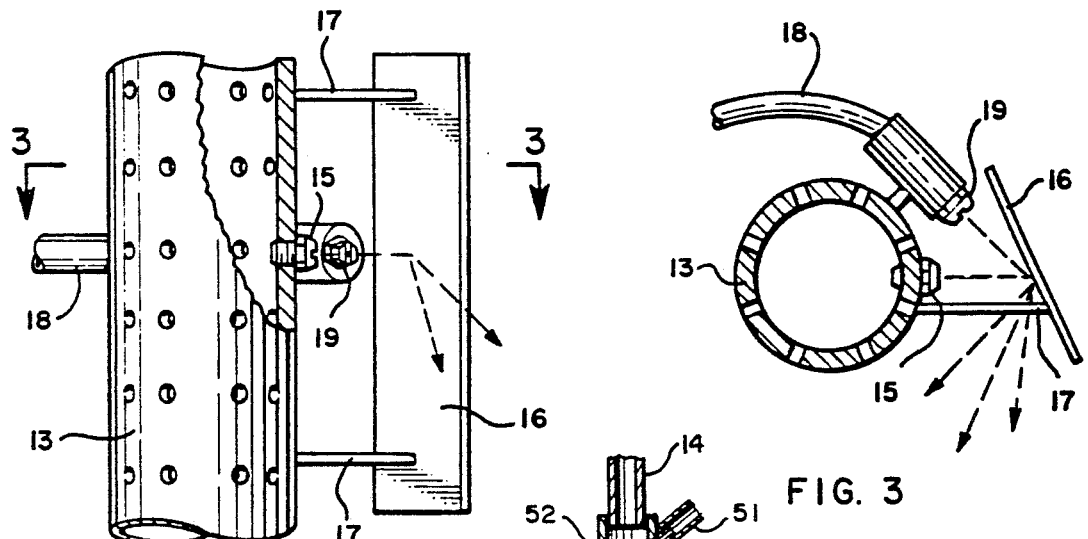
Figure 3:
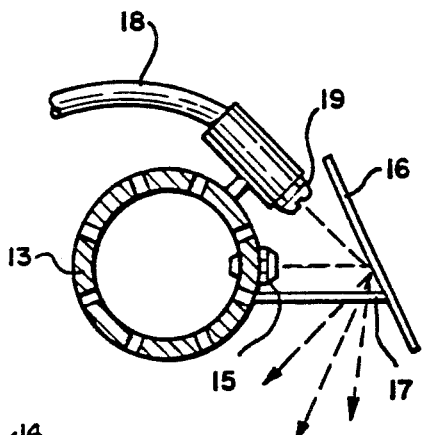

In the single scrubber chamber system of FIGS. 1-3, a steam scrubber 10 provides a scrubber chamber 11 into which exhaust gas to be treated is carried by an inflow conduit 12. Steam is introduced into chamber 11 along its height through the closed top of the scrubber and along the height of the scrubber chamber through a perforate pipe 13 from a steam supply conduit 14, as is the case in the apparatus of the aforenoted patents issued to Samuel Scott Ross.

It has now been determined that the type of steam used in the steam scrubber is important to most effective operations of the scrubber. Thus, for the most effective operation of the scrubber, particularly where additional treatment chemicals are not used, a super saturated steam is preferred. Generally, the particulate matter to be removed from the exhaust gas has a positive charge. While water naturally has a predominately positive charge, when vaporized to steam, it changes the polarity to a predominately negative charge. Just before reaching the dew point and returning to total liquid form, the negative charge is at its strongest point. At this stage there exist sub-micron size steam particles of basic negative charge. The combination of the negative charge, opposite the charge on the particles to be removed, and a base particle of liquid, gives the positively charged particles in the exhaust gas something to cling to. The actual size of the negatively charged steam particle is slightly larger than the particles being collected, with the negative charge being much stronger. The steam particles can therefore attract and collect a number of the smaller positively charged particles.

Figure 6:
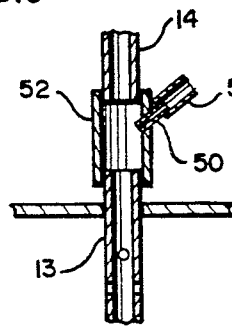

Since the preferred steam for use in the scrubber is a saturated or super saturated steam, in many cases it may be necessary to inject additional water into the steam before the steam is injected into the scrubber. For this purpose, additional water may be sprayed into conduit 14 just before it connects to perforate pipe 13, or just as the steam enters perforated pipe 13. For this purpose, a spray nozzle 50, FIG. 6, connected to a water supply line 51, may be positioned in a sleeve 52 connecting steam line 14 to perforated pipe 13. Water is sprayed into the steam as it passes the spray nozzle 50. The water sprayed into the steam immediately vaporizes and becomes steam, and adds to the moisture content of the steam. In adding water to the steam it is important not to condense any of the steam or merely add water particles. To work effectively in the invention, the steam should be steam and remain steam as it enters the scrubber chamber.

The scrubber is designed to allow adequate retention time of the steam and exhaust gas mixture to permit accumulation of mass, i.e., agglomeration of the steam particles and particles to be removed from the exhaust gas. Before exiting the scrubber chamber, the velocity of the agglomerated particles is reduced to the point that the force of gravity becomes greater than the force of velocity. The particles then drop to the bottom or sides of the chamber and accumulate at the lowest point.

In many instances, it will be desirable to inject a treatment chemical into the steam in the chamber. A jet nozzle 15 at the lower end portion of pipe 13 is directed laterally of pipe 13 toward an impingement plate 16 that is supported by brackets 17.

For mixing with the steam within scrubber chamber 11, a jet of a liquid containing a gas treatment chemical, such as water containing five percent lime (calcium carbonate) or slaked lime (calcium hydroxide), which chemicals would be difficult or impossible to mix directly with steam, i.e. the chemical would be prematurely precipated, is discharged from a supply conduit 18 through nozzle 19 and projected against impingement plate 16 at or adjacent to impingement of the steam thereon. The treatment liquid is atomized by striking the impingement plate and is intimately mixed with stem thereat and elsewhere within scrubber chamber 11. The impingement plate is preferably positioned at an angle to the incoming streams of chemical carrying liquid and steam, as shown, the latter being arranged so that the stream of chemical solution crosses streams of steam before impingement as indicated by the broken lines in FIG. 3. The droplets of steam tend to act as a carrier for the chemical and maintain the negative electrical charge that is natural to the steam. Thus, the chemical-carrying steam particles attract positively charged particles within the scrubber chamber, resulting in particle agglomeration and causing descent of such agglomerated particles in the scrubber chamber.

Steam condensate and solids, made up both of particulate matter carried into scrubber chamber 11 by the gas to be treated and agglomerated solid particles produced by reaction of the treatment chemical and atmospheric pollutants, such as sulfur dioxide and nitrogen oxide in the gas, flow out the bottom discharge pipe 20 of scrubber 10. For this purpose, scrubber 10 is preferably mounted above ground level on supports 21.

The gaseous effluent rising in scrubber chamber 11 flows through an outlet pipe 22 into the upper part of a vessel 23 that defines a cooling chamber 24 into which cooling water or other suitable liquid is sprayed by a spray pipe 25 from supply piping 26. As here shown, spray pipe 25 preferably extends axially within cooling chamber 24 throughout its height. The cooling spray and condensed steam settle as a mass of liquid at the bottom of vessel 23 and flow out through pipe 27. Thus, cooling chamber 24 serves also as a demisting chamber for mist carried over by the gas flowing from the steam scrubbers.

Effluent gas passes from chamber 24 into stack 28 by way of a pipe 29 and thence into the atmosphere through the open top of stack 28, which stack is advantageously provided with an adjustable damper 30 (shown schematically) in its otherwise closed bottom.

Figure 4:
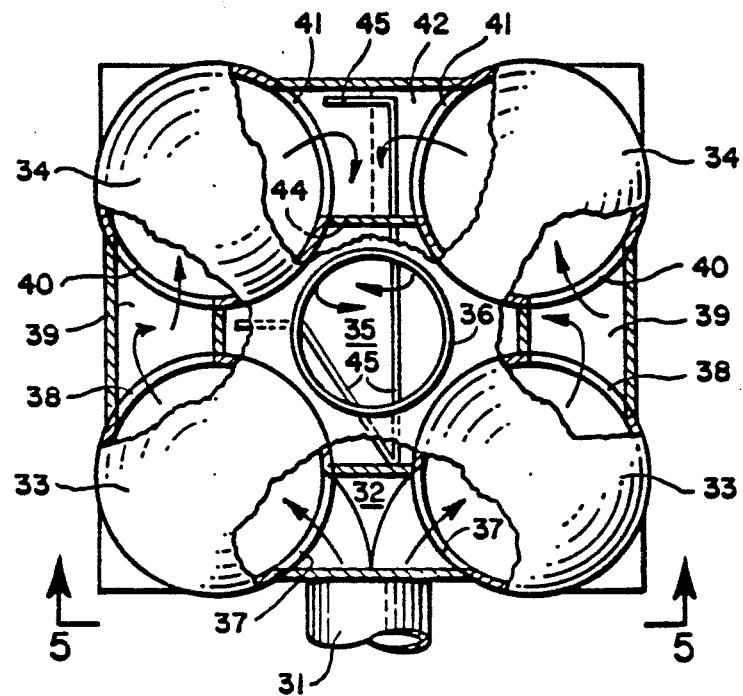
Figure 5:
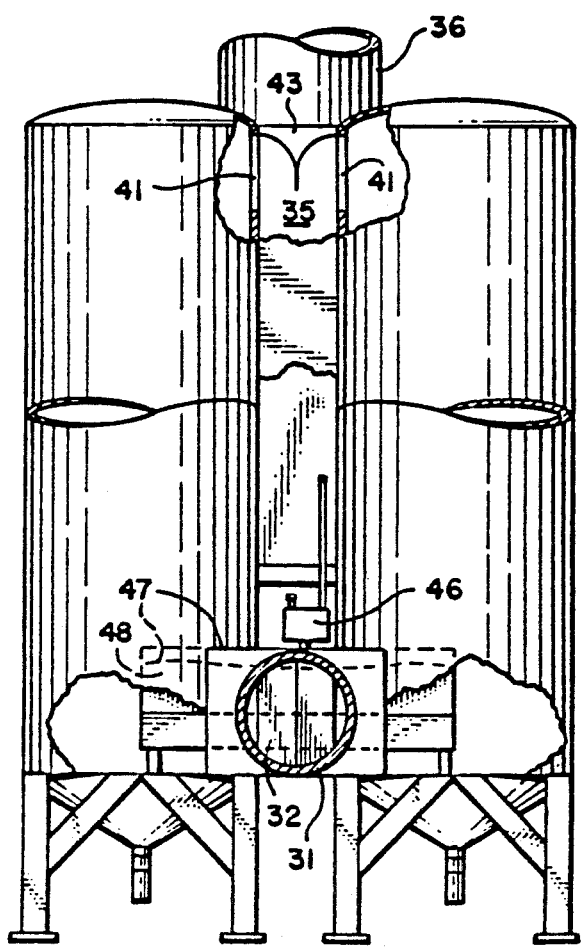

In the multiple steam scrubber chamber system of FIGS. 4 and 5, an incoming stream of exhaust gas to be treated as in the foregoing single steam scrubber chamber embodiment is introduced into the system through conduit 31, being split evenly by divider 32 to flow into opposite and mutually identical steam scrubber chamber sections, each as here shown comprising a set of serially arranged, double steam scrubbers 33 and 34, from where the mixed chemically treated gas and residual steam flow into a central cooling and demisting chamber 35 in common and from which the clean gas flows to the atmosphere through a stack 36 in common.

Each steam scrubber 33 and 34 corresponds to steam scrubber 10 of the prior embodiment. Flow of exhust gas into the first steam scrubber 33 of each set from conduit 31 is by way of ports 37, respectively, located in the lower portion of the respective scrubbers, the flow being divided by divider 32. Outflow of the treated gas and steam mixture from the first scrubbers of the respective sets is by way of upper ports 38, respectively, into respective downflow passages 39 that are interposed between the first and second scrubbers of the sets, and from there into the lower portions of second scrubbers 34 of the respective sets by way of lower ports 40, respectively. Outflow of the twice-treated gas and steam mixture from the second scrubbers of the respective sets is by way of upper ports 41, respectively, directed laterally into a single downflow passage 42 in common, downflow being aided by the presence of a deflector 43 at the entries of ports 41 into such downflow passage 42. Outflow from passage 42 of the downflowing clean gas and steam mixtures from the respective sets into cooling and demisting chamber 35 is by way of a lower port 44 in the lower portion of downflow passage 42.

Cooling and demisting chamber 35 is provided with spray bars 45 connected in flow communication with a high pressure pump 46 whose input is in the lower portion of a tank 47 at the bottom of cooling and demisting chamber 35, which catches the descending drops of spray and condensed steam and provides a pool 48 of the coolant liquid, usually water. Enroute to spray bars 45, the pumped coolant is passed through suitable cooling means (not shown).

Downflow passage 42 is advantageously made into an auxiliary cooling and demisting chamber by the provision therein of additional spray bars 45.

Outflow from the bottoms of the multiple steam scrubbers is advantagously passed into troughs (not shown) for disposal, while the clean and demisted gas is discharged to the atmosphere through stack 36 or may be passed to any desired location through suitable piping connected to such stack or to the upper part of chamber 35. The floor of recirculation tank 47 may be cleaned of precipitated matter from time to time.

While provision of the demisting chamber is usually advantageous, in some circumstances it may not be necessary and the treated exhaust gas can be released directly from the steam scrubber stage or stages without passing through a demister.

The concentrations of saturated steam in the steam scrubber required for optimum operation of the invention vary according to the application. In a test of the steam scrubber to capture dust particulates in the exhaust from an asphalt plant kiln dryer, the concentration of dry dust particulates was very high. In order to compensate for this, a high pressure was required using roughly 125 P.S.I. of steam with approximately 150 boiler horsepower (B.H.P.) required to control 35,000 C.F.M. of exhaust gas from the kiln dryer. In order to produce the required super saturated steam, approximately 4-5 gallons per minute of water was added to the steam before the steam was inserted into the scrubber chamber.

In another test to determine $SO_2$ and $NO_x$ control of exhaust gas from a tire incinerator, the volume of exhaust gas was approximately 2500 C.F.M. at the intake of the scrubber. Only 12 P.S.I. of steam was required, utilizing approximately 12 B.H.P. with approximately 1.5 to 1.7 G.P.M. of water being injected into the steam line before the steam was injected into the scrubber chamber. Treatment chemical in the form of a lime solution was added in the chamber in the manner described above, the test showed 100% $SO_2$ removed and 99% $NO_x$ removed.

A test on the exhaust gas from an open hearth of a steel plant showed the particulate control effeciencies varied depending upon the steam pressure and volume of water injected. At 110 P.S.I. steam and 1.5 G.P.M., effeciencies average 63.5%. With decreased pressure to 80 P.S.I. with 2.5 G.P.M. of water injected, the effeciency increased to 84.3%. Further decrease in steam pressure to 75 P.S.I. with water volume at 2 G.P.M., increased effeciency to 91.3%. Further decrease in steam pressure did not improve effeciencies, but rather decreased them.

In the above noted text, the steam injected at lower pressure had more moisture content. However, as the pressure dropped below the 75 P.S.I. (at lower pressure, less total volume of steam per unit of time is injected into the scrubber) the steam had too much water content so contained water vapor as well as steam, and the efficiency dropped.

Also, the above indicated testing at the steel plant showed high efficiencies in floride removal obtained through use of treatment chemical injection as described above. By injecting a lime solution into the steam in the scrubber chamber, effective floride removal was obtained. With chemical injection, the atomized particles of the treatment chemical solution mix with the steam and pick up the negative charge of the steam particles. Therefore, those sub-micron sized particles of treatment solution and steam, having a negative charge, tend to attract and react with those positively charged sub-micron sized particles of floride in the exhaust gas. In the tests using an atomized lime solution, floride removal efficiencies of up to 85.9% were achieved.

While some balancing and adjustment of the steam characteristics will be required for optimum performance for any particular application, a saturated or super saturated steam has been found to provide the best performance in the invention, and treatment chemical injection has been found effective to allow the invention to provide removal of exhaust gas constituents not effectively removed by the steam alone.

Whereas this invention is here illustrated and described with specific reference to the embodiments thereof presently contemplated as the best modes of carrying out such invention in actual practice, it is to be understood that various changes may be made in adapting the invention to different embodiments without departing from the broader inventive concepts disclosed herein and comprehended by the claims that follow.

I claim:

1. A steam scrubber system for cleaning exhaust gases, comprising a steam scrubber having at least one steam scrubber chamber; means for introducing steam into said at least one scrubber chamber; means for introducing a gas treatment, chemical carrying liquid into said at least one scrubber chamber; means for atomizing said liquid and mixing it with the steam in said at least one scrubber chamber to form a liquid and steam mixture in said at least one scrubber chamber; means for introducing a gas to be cleaned into said at least one scrubber chamber so that it contact, mixes with, and is cleaned by said liquid and steam mixture in the said at least one scrubber chamber; a cooling and demisting chamber; means for introducing the cleaned gas from the at least one scrubber chamber into said cooling and demisting chamber; means for spraying a cooling liquid into said cooling and demisting chamber to thereby cool and demist the said cleaned gas and reduce the amount of steam entrained therein; and means for discharging the cleaned gas from said cooling and demisting chamber.

2. A steam scrubber system according to claim 1, wherein the means for introducing steam into said at least one scrubber chamber includes a source of substantially saturated steam whereby the means for introducing steam into said at least one scrubber chamber introduces substantially saturated steam into said at least one scrubber chamber.

3. A steam scrubber system according to claim 2, wherein the source of substantially saturated steam provides steam to be introduced into the at least one scrubber chamber in a condition wherein said steam is just above its dew point.

4. A steam scrubber system according to claim 3, wherein the source of substantially saturated steam includes a source of steam and means for increasing the moisture content of the steam prior to adding the steam to the at least one scrubber chamber to insure that the steam is in a condition just above its dew point.

5. A steam scrubber system according to claim 4, wherein the means for increasing the moisture content of the steam includes means for spraying water into the steam prior to introducing the steam into the at least one chamber in such manner that the water sprayed into the steam vaporizes to increase the water content of the steam.

6. A steam scrubber system according to claim 5, wherein the means for spraying water into the steam sprays the water into the steam substantially immediately prior to the steam being introduced into the at least one scrubber chamber.

7. A steam scrubber system according to claim 2, wherein the source of substantially saturated steam includes a source of steam and means for increasing the moisture content of the steam prior to adding the steam to the at least one scrubber chamber to insure that the steam is substantially saturated when introduced into the at least one scrubber chamber.

8. A steam scrubber system for cleaning exhaust gases, comprising a steam scrubber having at least one steam scrubber chamber; means for introducing steam into said at least one scrubber chamber; means for introducing a jet of a gas treatment, chemical carrying liquid into said at least one scrubber chamber; impingement plate means within said at least one scrubber chamber positioned so that the jet of chemical carrying liquid is directed against said impingement plate means so that said liquid is atomized upon impingement against the impingement plate and mixed with the steam in said at least one scrubber chamber to form a liquid and steam mixture in said at least one scrubber chamber; means for introducing a gas to be cleaned into said at least one scrubber chamber so that it contacts, mixes with, and is cleaned by said liquid and steam mixture in the said at least one scrubber chamber; and means for separately discharging the cleaned gas and the residual material from the said at least one scrubber chamber.

9. A steam scrubber system according to claim 8, wherein the means for introducing steam into said at least one scrubber chamber includes a source of substantially saturated steam whereby the means for introducing steam into said at least one scrubber chamber introduces substantially saturated steam into said at least one scrubber chamber.

10. A steam scrubber system according to claim 9, wherein the source of substantially saturated steam includes a source of steam and means for increasing the moisture content of the steam prior to adding the steam to the at least one scrubber chamber to insure that the steam is substantially saturated when introduced into the at least one scrubber chamber.

11. A steam scrubber system according to claim 9, wherein the source of substantially saturated steam provides steam to be introduced into the at least one scrubber chamber in a condition wherein said steam is just above its dew point.

12. A steam scrubber system according to claim 11, wherein the source of substantially saturated steam includes a source of steam and means for increasing the moisture content of the steam prior to adding the steam to the at least one scrubber chamber to insure that the steam is in a condition just above its dew point.

13. A steam scrubber system according to claim 12, wherein the means for increasing the moisture content of the steam includes means for spraying water into the steam prior to introducing the steam into the at least one chamber in such manner that the water sprayed into the steam vaporizes to increase the water content of the steam.

14. A steam scrubber system according to claim 13, wherein the means for spraying water into the steam sprays the water into the steam substantially immediately prior to the steam being introduced into the at least one scrubber chamber.

15. A steam scrubber system for exhaust gases, comprising multiple steam scrubber chambers surrounding a cooling and demisting chamber in common, each of said steam scrubber chambers having means for separately introducing thereinto steam and gas to be cleaned, and said steam scrubber chambers being arranged in multiple sets of multiple chambers, the upper and lower portions of sequential chambers of each set being interconnected in series by means of interposed flow passages, the said sets having respective outlets for clean gas and steam mixtures into said cooling and demisting chamber.

16. A steam scrubber system according to claim 15, wherein a conduit for exhaust gas to be cleaned has a divided outlet connected, respectively, with the lower portions of the first steam scrubber chamber of the series sets.

17. A steam scrubber system according to claim 16, wherein a single downflow passage is interposed between the final steam chamber of the series of the respective sets to provide an outlet in common into the lower part of the cooling and demisting chamber.

18. A steam scrubber system according to claim 17, wherein the steam scrubber chambers are defined by individual steam scrubbers, respectively, which are clustered about the cooling and demisting chamber, said steam scrubbers partially defining both the interposed single downflow passage and said cooling and demisting chamber.

19. A steam scrubber system according to claim 18, wherein respective outlets from the final steam chambers of the series of the respective sets connect laterally with the interposed single downflow passage at an upper level therein in common; and wherein a flow deflector is interposed between said outlets to facilitate downflow in said single downflow passage.

20. A steam scrubber system according to claim 19, wherein a liquid holding tank is provided at the bottom of the cooling and demisting chamber to collect the cooling liquid sprayed into said chamber; and wherein means are provided for recirculating liquid from said holding tank through the spraying means.

21. A steam scrubber system according to claim 20, wherein there are only two sets of multiple chambers, and each set consists of two steam scrubber chambers arranged in series.

* * * * *